(12) United States Patent
Simonet et al.

(10) Patent No.: US 11,008,869 B2
(45) Date of Patent: May 18, 2021

(54) BELLY BAND SEALS

(71) Applicant: General Electric Technology GmbH, Baden (CH)

(72) Inventors: Christophe Simonet, Baden (CH); Marco Christof Pawlowski, Baden (CH); Giovanni Cataldi, Baden (CH)

(73) Assignee: General Electric Technology GmbH, Baden (CH)

( * ) Notice: Subject to any disclaimer, the term of this patent is extended or adjusted under 35 U.S.C. 154(b) by 293 days.

(21) Appl. No.: 15/962,709

(22) Filed: Apr. 25, 2018

(65) Prior Publication Data
US 2018/0347366 A1 Dec. 6, 2018

(30) Foreign Application Priority Data

Jun. 2, 2017 (EP) ..................................... 17174287

(51) Int. Cl.
*F01D 5/06* (2006.01)
*F01D 11/00* (2006.01)
*F02C 7/28* (2006.01)

(52) U.S. Cl.
CPC ............ *F01D 5/066* (2013.01); *F01D 11/005* (2013.01); *F02C 7/28* (2013.01); *F01D 5/06* (2013.01); *F05D 2240/55* (2013.01); *F05D 2260/30* (2013.01); *F05D 2260/36* (2013.01)

(58) Field of Classification Search
CPC .......... F01D 11/005; F01D 5/06; F01D 5/066; F02C 7/28; F05D 2240/55; F05D 2260/30; F05D 2260/36; F16J 9/24
See application file for complete search history.

(56) References Cited

U.S. PATENT DOCUMENTS

| 5,865,600 | A | 2/1999 | Mori et al. |
| 6,315,301 | B1 | 11/2001 | Umemura et al. |
| 7,581,931 | B2 | 9/2009 | Shaefer et al. |
| 9,291,065 | B2 | 3/2016 | Muller et al. |
| 9,334,738 | B2 | 5/2016 | Nereim et al. |
| 9,347,322 | B2* | 5/2016 | Gurao .................. F01D 5/06 |
| 2004/0052637 | A1 | 3/2004 | Paprotna et al. |
| 2009/0191050 | A1 | 7/2009 | Nereim et al. |
| 2014/0255169 | A1* | 9/2014 | Muller ............... F01D 11/003 415/173.7 |
| 2016/0010478 | A1 | 1/2016 | Gurao |
| 2016/0047263 | A1 | 2/2016 | Olejarski et al. |
| 2016/0069202 | A1 | 3/2016 | Shinde et al. |
| 2016/0376902 | A1* | 12/2016 | Brooks ............... F01D 11/005 416/198 A |

OTHER PUBLICATIONS

Extended European Search Report and Opinion issued in connection with corresponding EP Application No. 17174287.7 dated Nov. 10, 2017.

* cited by examiner

*Primary Examiner* — Kenneth Bomberg
*Assistant Examiner* — Julian B Getachew
(74) *Attorney, Agent, or Firm* — Eversheds Sutherland (US) LLP

(57) ABSTRACT

The present application provides a rotor for use in a turbine engine. The rotor may include a first rotor disc, a second rotor disc adjacent to the first rotor disc, and a belly band seal positioned between the first rotor disc and the second rotor disc. The belly band seal may include a band seal with a locking tab brazed thereon.

18 Claims, 3 Drawing Sheets

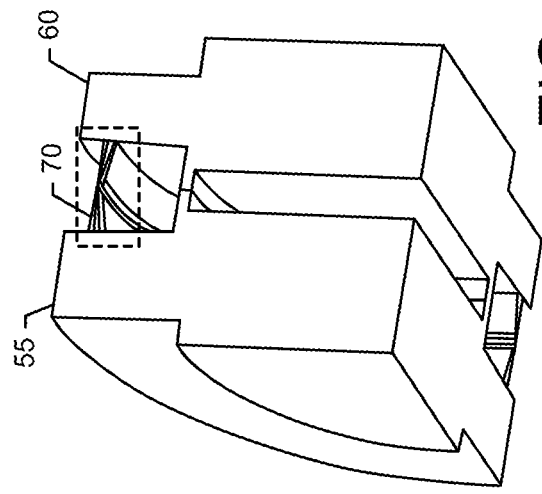
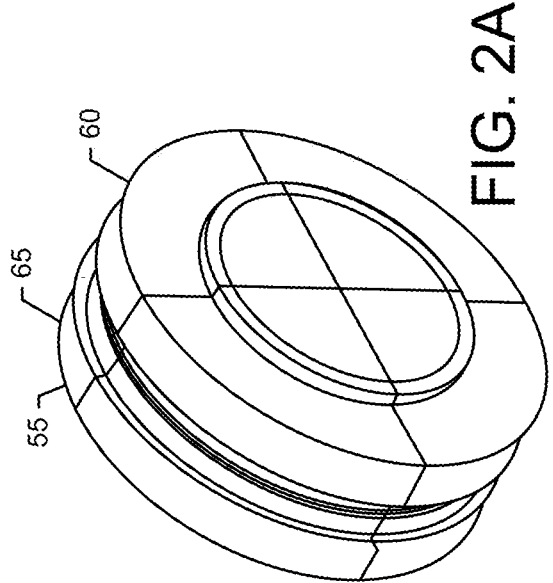
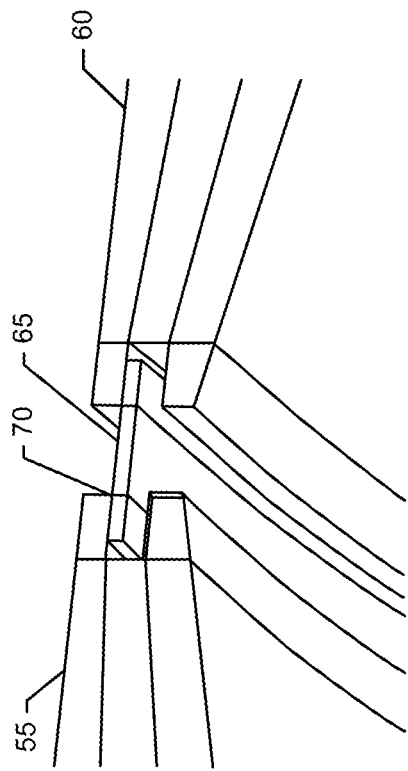

BELLY BAND SEALS

TECHNICAL FIELD

The present application and resultant patent relate generally to gas turbine engines and more particularly relate to a gas turbine engine having a rotor with a number of belly band seals having a form fitting circumferential anti-rotation feature positioned between adjacent discs.

BACKGROUND OF THE INVENTION

Generally described, gas turbine engines have one or more combustion chambers where a fuel is injected, mixed with a compressed air flow from a compressor, and combusted to generate high pressure combustion gases. In turn, the high pressure combustion gases are expanded in a turbine to produce mechanical work. The compressor and the turbine include stages having a number stationary or non-rotary components, e.g., vane structures, that cooperate with a number of rotatable components, e.g., rotor blades, for compressing and expanding the air flow and the combustion gases therein.

The rotor blades are typically mounted on discs that are supported for rotation on a rotor shaft. A disc cooling air cavity may be formed on an inner side of a pair of annular arms between the discs of mutually adjacent stages. Specifically, those arms may be provided with a slot for receiving a sealing strip, also known as a "belly band" seal, which bridges the gap between the discs to prevent the cooling air flowing through the cooling air cavity from leaking into the path of the hot combustion gases.

The belly band seal may be segmented and typically may include four (4) band-segments. The segments may be distributed circumferentially and may sit inside a slot created by the two adjacent discs. In order to prevent the belly band seal from sliding freely inside the slot in a circumferential direction, a locking mechanism generally may be required. Known locking mechanisms may include a tab with a tab-nose. The tab generally must be bent during installation. Such bending may introduce a risk of breaking the nose during the installation/bending process and a potential loss of the entire tab in case that the connection cracks and fails. In addition, other tabs features included cuts in the main band which may create high notch stress resultant from loads due to friction, centrifugal forces and thermal expansion. Damage to the seal may lead to a drop in the cooling air flow and possibly a forced outage.

SUMMARY OF THE INVENTION

The present application and the resultant patent thus provide a rotor for use in a turbine engine. The rotor may include a first rotor disc, a second rotor disc adjacent to the first rotor disc, and a belly band seal positioned between the first rotor disc and the second rotor disc. The belly band seal may include a band seal with a locking tab brazed thereon.

The present application and the resultant patent further may provide a method of positioning a belly band seal between a first rotor disc and a second rotor disc. The method may include the steps of brazing a locking tab on to a band seal of the belly band seal, positioning the band seal within a first slot on the first rotor disc and a second slot on the second rotor disc, and positioning the locking tab within a first counter-groove on the first rotor disc and a second counter-groove on the second rotor disc.

The present application and the resultant patent further may provide a rotor for use in a turbine engine. The rotor may include a first rotor disc with a first counter-groove, a second rotor disc adjacent to the first rotor disc with a second counter-groove, and a belly band seal positioned between the first rotor disc and the second rotor disc. The belly band seal may include a band seal with a locking tab brazed thereon. The locking tab may be positioned within the first counter-groove and the second counter-groove.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 2A is a perspective view of a pair of rotor discs with a known belly band seal therebetween that may be used with the turbine of the gas turbine engine of FIG. 1.

FIG. 2B is a partial sectional view of the rotor discs and the belly band seal of FIG. 2A.

FIG. 2C is a further partial sectional view of the rotor disc and the belly band seal of FIG. 2A.

DETAILED DESCRIPTION

Figure 1:
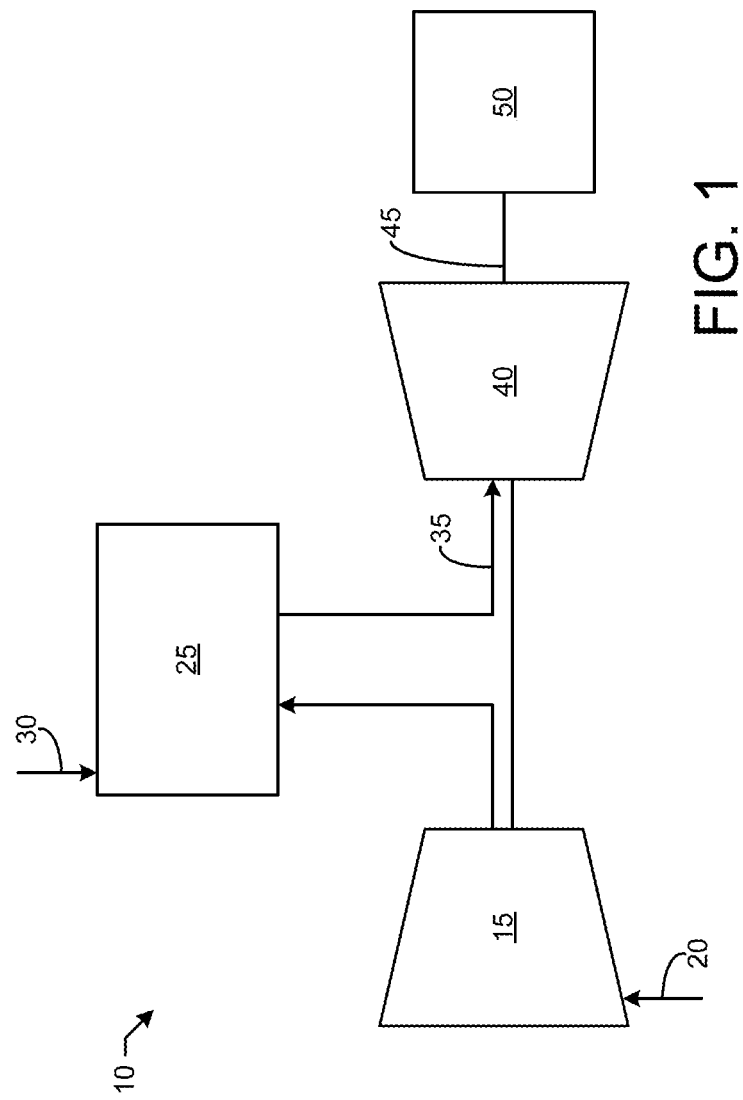
FIG. 1 is a schematic diagram of a gas turbine engine showing a compressor, a combustor, a turbine, and a load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25 configured in a circumferential array and the like. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

FIGS. 2A-2C show a pair of adjacent rotor discs, a first rotor disc 55 and a second rotor disc 60, that may be positioned in the turbine 40. A belly band seal 65 may be positioned within a slot 70 formed in each of the rotor discs 55, 60 so as to separate the cooling air flow from the hot gas path. As described above, the segments of the belly band seal 65 generally require a locking mechanism to remain in place. Known locking mechanisms, however, may be prone of failure.

Figure 4:
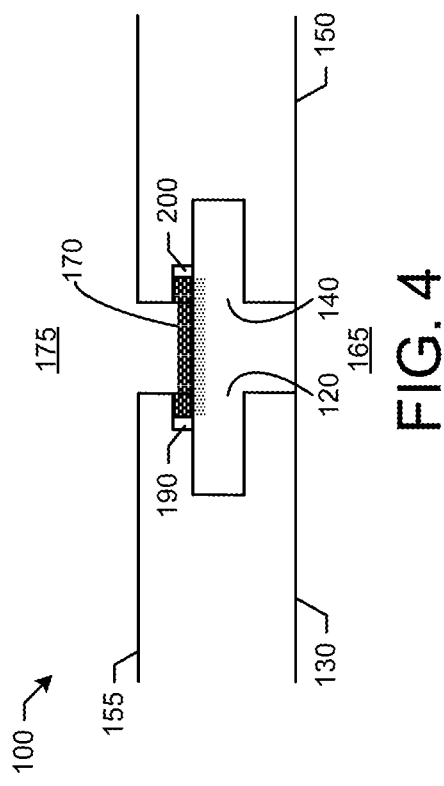
FIG. 4 is a partial sectional view of the belly band seal of FIG. 3.
Figure 3:
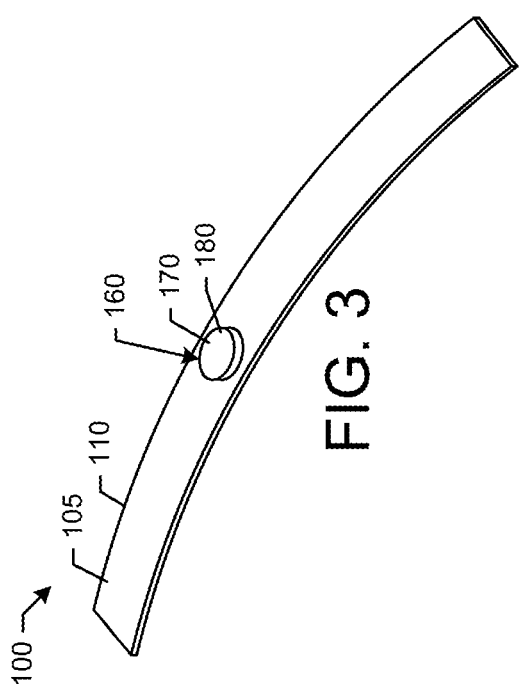
FIG. 3 is a perspective view of the belly band seal as may be described herein.

FIGS. 3 and 4 show an example of a belly band seal 100 as may be described herein. The belly band seal 110 may include a seal band 105 formed in four (4) segments 110, although any number of the segments 110 may be used herein. The belly band seal 100 may have any suitable size, shape, or configuration. The segments 110 of the belly band seal 100 may be distributed circumferentially. The segments 110 of the belly band seal 100 may be positioned with a first slot 120 formed in a first rotor disc 130 and a second slot 140 formed in a second rotor disc 150. The slots 120, 140 and the discs 130, 150 may have any suitable size, shape, or configuration. The rotor discs 130, 150 form part of the overall rotor 155. The belly band seal 100 may separate a cooling air cavity 165 from the hot gas path 175. Other components and other configurations may be used herein.

The belly band seal 100 also may include a locking mechanism 160. In this example, the locking mechanism 160 may include a tab 170 with a circular or elliptical shape 180. The tab 170 may have any suitable size, shape, or configuration. The tab 170 may brazed or otherwise attached to the seal band 105. The tab 170 may be positioned completely within the edges of the band seal 105 with no overhang and no cuts within the band seal 105. The slots 120, 140 of the discs 130, 150 may have a first counter-grove 190 formed in the first slot 120 and a second counter-grove 200 formed in the second slot 140. The counter-groves 190, 200 may be sized for the tab 170 to create a form fit. This form fit between the tab 170 and the counter-grooves 190, 200 may keep the tab 170 in place and transfer tangential/circumferential forces. Other components and other configurations may be used herein.

The use of the tabs 170 thus keeps the seal band 105 in place and prevents free circumferential sliding within the slots 120, 140, especially during rotor barring as well as acceleration or deceleration of the rotor. Moreover, the tab 170 may be additionally secured and contained inside the counter-grooves 190, 200 in case the brazed connection fails so as to mitigate the risk that the tab 170 could fall into the flow path. Additionally, the tab 170 is now loaded by compressive stress rather than tensile stress so as to reduce the risk of crack initiation or propagation The belly band seal 100 described herein thus provides a simple geometric design that requires a minimum of manufacturing steps as compared to known competitive designs that tend to be more complex and expensive. Moreover, the belly band seal 100 is more secure in that the brazed connection is now mainly loaded by compressive stress instead of tensile stress, which may significantly reduce the risk of failure.

Figure 5:
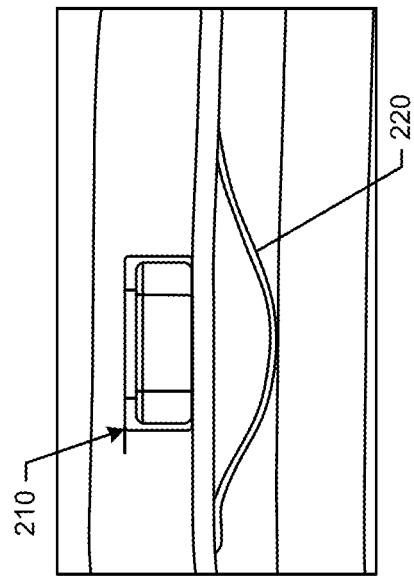
FIG. 5 is a side plan view of an alternative embodiment of a belly band seal as may be described herein.

FIG. 5 is a further embodiment of a belly band seal 210 as may be described herein. In this example, a counter spring 220 may be positioned on the band seal 105 on the opposite side of the tab 170. The counter spring 220 may be of conventional design and may have any suitable size, shape, or configuration. The counter spring 220 further assists in maintaining the belly band seal 210 in place. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

What is claimed:

1. A rotor for use in a turbine engine, comprising:
   a first rotor disc comprising a first slot and a first counter-groove;
   a second rotor disc adjacent to the first rotor disc comprising a second slot and a second counter-groove; and
   a belly band seal positioned between the first rotor disc and the second rotor disc;
   the belly band seal comprising a band seal with a locking tab disposed completely on a radially outer surface of the band seal with no overhang and brazed thereon;
   wherein the band seal is positioned within the first slot and the second slot and the locking tab is positioned between the first counter-groove and the second counter-groove.

2. The rotor of claim 1, wherein the locking tab is positioned within the first counter-groove and the second counter-groove in a form fit.

3. The rotor of claim 1, wherein the locking tab comprises a circular or an elliptical shape.

4. The rotor of claim 1, wherein the belly band seal comprises a plurality of segments.

5. The rotor of claim 4, wherein the belly band seal comprises four segments.

6. The rotor of claim 1, wherein the belly band seal comprises a counter spring.

7. The rotor of claim 6, wherein the counter spring is positioned on the band seal opposite the locking tab.

8. The rotor of claim 1, wherein the belly band seal comprises a plurality of locking tabs.

9. The rotor of claim 1, wherein the belly band seal separates an air cavity and a hot gas path in the gas turbine engine.

10. The rotor of claim 1, wherein the rotor comprises a turbine rotor.

11. The rotor of claim 1, wherein the band seal comprises no cuts about the locking tab.

12. A method of positioning a belly band seal between a first rotor disc and a second rotor disc, comprising:
   disposing and brazing a locking tab completely onto a radially outer surface of a band seal of the belly band seal with no overhang;
   positioning the band seal within a first slot on the first rotor disc and a second slot on the second rotor disc; and
   positioning the locking tab within a first counter-groove on the first rotor disc and a second counter-groove on the second rotor disc.

13. A rotor for use in a turbine engine, comprising:
   a first rotor disc;
   a second rotor disc adjacent to the first rotor disc;
   wherein the first rotor disc comprises a first counter-groove and the second rotor disc comprises a second counter-groove; and
   a belly band seal positioned between the first rotor disc and the second rotor disc;
   the belly band seal comprising a band seal with a locking tab disposed completely on a radially outer surface of the band seal with no overhang and brazed thereon; and
   wherein the locking tab is positioned within the first counter-groove and the second counter-groove.

14. The rotor of claim 13, wherein the first rotor disc comprises a first slot, wherein the second rotor disc comprises a second slot, and wherein the band seal is positioned within the first slot and the second slot.

15. The rotor of claim 13, wherein the locking tab is positioned within the first counter-groove and the second counter-groove in a form fit.

16. The rotor of claim 13, wherein the locking tab comprises a circular or an elliptical shape.

17. The rotor of claim 13, wherein the belly band seal comprises a counter spring.

18. The rotor of claim 13, wherein the band seal comprises no cuts about the locking tab.

* * * * *